United States Patent [19]

Robinson, Jr.

[11] 4,234,364
[45] Nov. 18, 1980

[54] CROSSLINKED DOUBLE BASE PROPELLANT BINDERS

[75] Inventor: Anderson E. Robinson, Jr., Destin, Fla.

[73] Assignee: Hercules Incorporated, Wilmington, Del.

[21] Appl. No.: 910,792

[22] Filed: May 30, 1978

[51] Int. Cl.² ............................................. C06B 45/10
[52] U.S. Cl. ................... 149/19.4; 149/19.8; 149/20; 149/100
[58] Field of Search ................... 149/19.4, 19.8, 20, 149/96, 100

[56] References Cited

U.S. PATENT DOCUMENTS

| 3,354,010 | 11/1967 | Hopper | 149/19.8 |
|---|---|---|---|
| 3,554,820 | 1/1971 | Evans | 149/19.4 |
| 3,711,344 | 1/1973 | Pierce | 149/100 |
| 3,716,604 | 2/1973 | Dehm | 149/95 |
| 3,798,090 | 3/1974 | Allabashi | 149/19.4 |
| 3,894,894 | 7/1975 | Elrick | 149/19.4 |
| 3,907,619 | 9/1975 | Elrick | 149/98 |
| 3,956,890 | 5/1976 | Davis | 149/19.8 |
| 4,011,114 | 3/1977 | Allabashi | 149/19.4 |
| 4,014,720 | 3/1977 | Wells | 149/19.8 |
| 4,038,115 | 7/1977 | Dehm | 149/19.8 |

*Primary Examiner*—Edward A. Miller
*Attorney, Agent, or Firm*—Michael B. Keehan

[57] ABSTRACT

A crosslinked binder for crosslinked double base propellant is provided. The binder is prepared from nitrocellulose having a nitrogen content of 11 to 13.4% N and an intrinsic viscosity of 0.55 dl./gram to 2.0 dl./gram, a polymeric diol having a hydroxyl functionality of 1.9 to 2.1 and a polyfunctional isocyanate having an NCO functionality of at least three. The propellant prepared from the binder exhibits improved mechanical properties without detriment to ballistic performance.

9 Claims, No Drawings

CROSSLINKED DOUBLE BASE PROPELLANT BINDERS

This invention relates to improved crosslinked binder compositions for crosslinked double base propellant. The improved crosslinked binder compositions of this invention exhibit improved propellant mechanical properties, reliability, and safety without detriment to the ballistic performance of the propellant composition of which they form a part.

BACKGROUND OF THE INVENTION

Crosslinked double base propellant compositions generally comprise a urethane rubber binder plasticized with nitroglycerin and filled with particulate solid fuels and oxidizers. The urethane rubber binder employed in such propellants comprises a low molecular weight nitrocellulose and a low molecular weight polyester polyol crosslinked with a diisocyanate. Due to the low molecular weight and high hydroxyl functionality of the nitrocellulose and of the polyester polyol employed in prior art urethane rubber binder compositions, the potential crosslink density of such binders is much higher than is desirable for good elastomeric quality.

Attempts to avoid the undesirable consequences of over crosslinking have been based on the use of amounts of diisocyanate crosslinker considerably less than is sufficient for a stoichiometric urethane reaction. In this method of attempting to avoid over crosslinking, substantial portions of the nitrocellulose and the polyester polyol in the composition are unreacted and therefore unintegrated in the urethane binder polymer network resulting from the crosslinking reaction. Any partially unreacted nitrocellulose or polyester polyol in the binder polymer network produces a side chain mass which is detrimental to elastomeric quality. Additional side chain mass can result from partial reaction of the diisocyanate crosslinking agent with, for example, other components of the propellant composition such as stabilizing agents, which reactions often cause chain termination. Still other side chain mass is produced by cyclization of the polymer network resulting from high dilution (low concentration) of reactive species by the plasticizer.

As a result of the occurrence of such reactions, solid propellants prepared utilizing state of the art urethane rubber binder have marginal or unsatisfactory mechanical properties and fail to qualify for certain rocket motor performance specifications. Mechanical properties of propellants utilizing state of the art urethane binder systems, especially strain capability, are severely limited as the solids loading of such binder systems is increased above about 70%.

It is an object of this invention to provide an improved crosslinked binder composition for crosslinked double base propellant having improved mechanical quality, reliability and safety over the state of the art crosslinked double base propellant binder compositions.

It is another object of this invention to provide an improved urethane rubber binder composition for use in crosslinked double base propellant compositions in which effective crosslinked density control in the binder can be established, and in which solids loading greater than about 70% by weight can be achieved while retaining satisfactory mechanical properties.

STATEMENT OF THE INVENTION

In accordance with this invention a crosslinked binder composition is provided in which the binder is a urethane rubber comprising the reaction product of a high molecular weight nitrocellulose, a polymeric diol, and a polyfunctional isocyanate having a functionality of at least 3, in which the weight ratio of nitrocellulose to polymeric diol is from about 0.15 to about 0.001 and the ratio of isocyanate functional groups to the combined hydroxyl functionality of the polymeric diol and nitrocellulose is from about 1/1 to about 1.5/1. In the crosslinked double base propellant of this invention, the improved binder system comprises from about 4% to about 10% by weight and preferably from 5% to 7% by weight of the crosslinked double base propellant composition.

The nitrocellulose which can be employed in the process of this invention has an intrinsic viscosity of at least about 0.55 deciliters/gram and a calculated molecular weight range of from about 22,000 to about 120,000. Nitrocellulose is not inherently elastomeric but nitrocellulose having a high intrinsic viscosity is tougher than nitrocellulose having a low intrinsic viscosity, i.e., below about 0.55 deciliters/gram. Using a much lower concentration of higher intrinsic viscosity nitrocellulose results in a binder having improved mechanical properties. Suitable nitrocellulose materials which can be employed in the binder composition of this invention are more fully described in Table I below except for RS 18-25 cps nitrocellulose which has a low intrinsic viscosity and cannot be used in the binder system of this invention.

TABLE I

| Nitrocellulose Type[1] | Approx. Nitrogen (Wt. %) | Calculated Molecular Weight[2] | Approx. Intrinsic Viscosity dl/gram[3] | Solution[4] Viscosity (seconds) |
|---|---|---|---|---|
| RS 18-25 cps | 12.0 | 14,000 | 0.40 | 18-25 cps (12.2% soln.) |
| RS ¼ sec | 12.0 | 22,000 | 0.55 | 4-5 sec. (25% soln.) |
| RS ½ sec | 12.0 | 33,000 | 0.72 | 3-4 sec. (20% soln.) |
| RS ¾ sec | 12.0 | 42,000 | 0.88 | 6-8 sec. (20% soln.) |
| RS 5-6 sec | 12.0 | 68,000 | 1.47 | 5-6.5 sec. (12.2% soln.) |
| RS 15-20 sec | 12.0 | 90,000 | 1.87 | 15-20 sec. (12.2% soln.) |
| Pyrocotton | 12.6 | 120,000 | >2 | 15 sec. (10% soln.) |
| Guncotton | 13.4 | 120,000 | >2 | 15 sec. (10% soln.) |
| SS ¼ sec | 11.0 | 22,000 | 0.55 | 4-5 sec. (25% soln.) |
| SS ½ sec | 11.0 | 33,000 | 0.72 | 3-4 sec. (20% soln.) |

TABLE I-continued

| Nitrocellulose Type[1] | Approx. Nitrogen (Wt. %) | Calculated Molecular Weight[2] | Approx. Intrinsic Viscosity dl/gram[3] | Solution[4] Viscosity (seconds) |
|---|---|---|---|---|
| SS 5-6 | 11.0 | 42,000 | 1.47 | 5-6.5 sec. (12.2% soln.) |

[1]RS and SS type designations for nitrocellulose specifically refer to designations used by Hercules Incorporated for nitrocellulose grades sold by Hercules Incorporated. An "RS" type nitrocellulose indicates solubility of the nitrocellulose in esters such as ethyl and butyl acetates, in ketones and glycol ethers. As "SS" type nitrocellulose indicates solubility of the nitrocellulose in mixtures of alcohol and toluene. See "Nitrocellulose, Properties and Uses", Hercules Powder Company, (1955), pages 10, 11, 12.
[2]Molecular weight calculated from intrinsic viscosity values. See article entitled "Intrinsic Viscosity of Nitrocellulose, C. H. Lindsley and M. B. Frank, Industrial and Engineering Chemistry, November 1953, pp. 2491-2497.
[3]Intrinsic Viscosity determined using acetone solvent.
[4]Solution viscosity is measured by the Falling Ball Method using as the solvent a mixture comprising by weight, 20% ethyl acetate, 25% denatured ethyl alcohol and 55% toluene.

The polymeric diols which can be employed in the urethane binder system of this invention have a hydroxyl functionality of from about 1.9 to about 2.1 and include polyester diols and polyether diols. The molecular weight range of the polyester and polyether diols which can be employed in the process of this invention is from about 1,000 to about 10,000 and the diols must be liquids below about 60° C., which is the upper processing temperature used in preparation of the crosslinked double base propellants of this invention.

Polyester diols which can be employed in the process of this invention can be obtained by reaction of monomeric dialcohols such as ethylene glycol, diethylene glycol, propylene glycol, butylene glycol, hexamethylene glycol, mixtures thereof, and the like, with dibasic acids such as succinic acid, adipic acid, azelaic acid, sebacic acid, oxadibutyric acid, mixtures thereof, and the like.

Polyether diols which can be employed in this invention can be made by the polymerization of unsubstituted cyclic monomers such as ethylene oxide (oxirane), trimethylene oxide (oxetane), and tetramethylene oxide (tetrahydrofuran). Copolymers made from mixtures of these are also useful. These polymers all have primary hydroxyl terminal groups, which are preferred for reasons of better reactivity with isocyanates. Polyether diols derived from substituted monomers such as propylene oxide have secondary hydroxyl terminal groups. These can also be used but they require more catalyst than diols having terminal primary hydroxyl groups described above. Block copolymers of propylene oxide with ethylene oxide end blocks can also be employed.

Other polymeric diols which can be employed are reaction products of any of the polyester and polyether diols as set forth above in which linear chain extension of the polyester or polyether diol has been achieved by reaction with a diisocyanate. Chain extended polymers are made by reacting the diol(s) and diisocyanate(s), uncatalyzed and at elevated temperature, in the proportion of n moles of diisocyanate to n+1 moles of diol. The excess diol insures that the product will be hydric (and not isocyanate) terminated. Total moles times respective molecular weights is the product molecular weight. The reaction may be run in bulk or in inert solvents such as acetonitrile. The useful limits on product molecular weight are 1000 to 10,000. Aromatic as well as aliphatic diisocyanates may be used, including, by way of illustration only, toluene diiscyanate, diphenylmethane diisocyanate, hexamethylene diisocyanate, dicyclohexylmethane diisocyanate, and the like.

The polyfunctional isocyanates which can be employed in the new improved urethane binder composition of this invention must have a NCO functionality of at least 3. Isocyanates having an NCO functionality of 2 are not satisfactory for use in the improved urethane binder of this invention since the improved mechanical properties of the binder and the propellants prepared from the binder depend upon the partial sacrificial use of isocyanate. Particularly suitable isocyanates having a functionality ality of at least 3 are aliphatic isocyanates available commercially from Mobay Chemical Company and sold under the trademark DESMODUR, N-100. Aromatic isocyanates having an NCO functionality of greater than 3 are available as a high molecular weight fraction of polymethylene polyphenylisocyanates from which diisocyanate molecules in the mixture have been removed. Such materials are available commercially under the trademark "PAPI" from the Upjohn Company.

In formulating the urethane binder composition of this invention the effective urethane stoichiometry should be not less than about 1.0. To achieve such stoichiometry considering the presence of various ingredients within the propellant formulation capable of reaction with the isocyanate, it is necessary to formulate the binder composition to higher stoichiometries based on the isocyanate. Thus, in the propellant composition of this invention the ratio of isocyanate functional groups to the combined hydroxyl functionality of the polymeric diol and nitrocellulose is from about 1/1 to about 1.5/1.

In formulating a crosslinked double base propellant composition employing the urethane propellant binder of this invention the weight ratio of plasticizer/binder is mainly determined by ballistic considerations, however, the plasticizer/binder weight ratio should be maintained at a level less than about 4.5/1 and a preferred plasticizer/binder weight ratio range is from about 2/1 to about 3.5/1.

The examples which follow more fully illustrate the urethane rubber binder and crosslinked double base propellant compositions prepared from said urethane rubber binder.

EXAMPLE 1

Propellant compositions utilizing the urethane binder systems of this invention may be prepared in the following manner.

Nitrocellulose, suitable stabilizers, and the polymeric diol are dissolved in nitroglycerin (plasticizer) to produce a homogeneous fluid lacquer. The lacquer is sparged with dry nitrogen to remove moisture and other volatiles. This operation is carried out at low elevated temperatures (up to about 50° C.). Solid polymeric diols should be premelted. The lacquer is storable. The polyfunctional isocyanate and the particulate solid fuels and oxidizers are then added and mixed into the lacquer to produce a castable slurry. This operation is carried out at low elevated temperatures (up to about 60° C.). The slurry is storable. Finally, the urethane catalyst is added to the slurry and mixed. The completed mix is then cast into a suitable mold, placed in an oven operated at a low elevated temperature (up to about 60° C.) and cured for a period of about seven days.

EXAMPLES 2-4

Following the mixing procedure described in Example 1, a propellant composition (prior art) having a urethane rubber binder prepared by reaction of low molecular weight nitrocellulose having an intrinsic viscosity of about 0.4 dl/gram, a calculated molecular weight of about 14,000, a polyester polyol which is diethylene glycol adipate having a hydroxyl functionality of 3, and a diisocyanate crosslinking agent is prepared and tested. This prior art propellant composition (Example 2) is compared with propellant compositions containing the improved urethane rubber binder of this invention. Results of testing are set forth in Table II.

TABLE II

| Example No. | 2 (Prior Art) | 3 | 4 |
|---|---|---|---|
| Nitrocellulose (NC)* | RS18–25cps | RS5sec | RS5sec |
| Intrinsic Viscosity (dl./g.) | 0.40 | 1.47 | 1.47 |
| Polyester Type (Poly) | R18[a] | S1011[b] | CE-S1011[c] |
| Molecular Weight | 2700 | 3200 | 8000 |
| Functionality | 3 | 2 | 2 |
| Ratio, NC/Poly (Wt.) | 0.25 | 0.03 | 0.03 |

TABLE II-continued

| Isocyanate Type | HDI[e] | N100[d] | N100[d] |
|---|---|---|---|
| Functionality | 2 | 4–4.5 | 4–4.5 |
| Ratio, NCO/OH (Equivalents) | 0.85 | 1.2 | 1.4 |
| Ratio, Plasticizer/Binder (Weight) | 2.2 | 2.8 | 3.2 |
| Propellant Solids Content (Wt. %) | Mechanical Properties - 2 In./Min. (Test Rate) Instron Tester, Ambient Pressure, 77° C. Stress/Strain/Modulus (psi/%/psi) | | |
| 70 | 84/92/408 | 89/175/425 | |
| 73 | 83/27/823 | 80/166/410 | |
| 74 | | 72/155/550 | |
| 75 | | 69/141/690 | 72/145/343 |
| 76 | | 58/99/760 | 65/171/467 |
| 77 | | 57/20/630 | 61/182/489 |
| 78 | | | 58/179/517 |
| 79 | | | 56/25/595 |

*See Table I for chemical properties of nitrocellulose.
[a]A clear colorless low viscosity liquid polyester sold by Mobay Chemical Co. under the trademark MONDUR, R-18.
[b]Diethyleneglycol adipate, a clear colorless liquid of medium viscosity sold by Hooker Chemical Co. under the trademark RUCOFLEX, S1011-35.
[c]A chain extended, clear colorless viscous polyester urethane diol liquid made from 2 moles of RUCOFLEX, S1011-35 and 1 mole of hexamethylene diisocyanate.
[d]A clear colorless low viscosity liquid, nominally the cyclic trimer of hexamethylene diisocyanate but containing hexafunctional isocyanates and sold by Mobay Chemical Co. under the trademark DESMODUR, N-100.
[e]HDI is hexamethylene diisocyanate.

EXAMPLES 5-9

In the examples which follow, examples 5 and 7 are prior art propellant compositions which are used as controls for evaluation of the urethane binder composition of this invention. Example 6 is a propellant of this invention exhibiting substantially the same ballistic performance as the prior art propellant (Ex. 5). The superior mechanical properties of the propellant of this invention are evident from inspection of the mechanical property date. Examples 8 and 9 are propellants of this invention.

TABLE III

| Example Number | 5 | 6 | 7 | 8 | 9 |
|---|---|---|---|---|---|
| Nitrocellulose Type* | RS18–25 cps | RS5sec | RS18–25 cps | RS5sec | RS5sec |
| Intrinsic Viscosity, (dl/g.) | 0.40 | 1.47 | 0.40 | 1.47 | 1.470 |
| Polyester Type | R18 | S1011 | R18 | S1011 | CE-S1011 |
| Molecular Weight | 2700 | 3000 | 2700 | 3000 | 8000 |
| Functionality | 3 | 2 | 3 | 2 | 2 |
| NC/Polymer (wt. ratio) | 0.46 | 0.03 | 0.25 | 0.03 | 0.07 |
| NCO Type | HDI | N-100 | HDI | N-100 | N-100 |
| Functionality | 2 | 4 | 2 | 4 | 4 |
| NCO/OH (eq.) | 0.60 | 1.20 | 0.85 | 1.20 | 1.40 |
| Plasticizer/Polymer (wt. ratio) | 2.5 | 2.8 | 2.2 | 2.8 | 3.2 |
| Solids % (weight) | 77 | 75 | 70 | 70 | 70 |
| Mechanical Properties | | | | | |
| 2 In./Min. (Test Rate), Instron Tester, at Ambient Pressure & 77° F. | | | | | |
| Stress (psi) | 56 | 77 | 84 | 120 | 120 |
| Elongation (%) | 30 | 137 | 92 | 151 | 70 |
| Modulus (psi) | 412 | 536 | 408 | 418 | 305 |
| 200 In./Min. (Test Rate), Research Inc. Tester, at 1000 PSI & 77° F. | | | | | |
| Stress (PSI) | 185 | 230 | 218 | 260 | 278 |
| Elongation (%) | 83 | 121 | 148 | 191 | 75 |
| ASTM Tear Strength (PLI) | 8 | 19 | | | |
| CIV (ft./sec.)** | 340 | 510 | 544 | 770 | 800 |

(a), (b), (c), (d) and (e), see corresponding footnotes, TABLE II.
*See TABLE I for additional properties of nitrocellulose.
**CIV Critical impingement velocity. This is a measure of propellant toughness. In this test a small sample of propellant is impacted against a steel plate by means of a shotgun. The fragmented propellant is then collected and burned in a closed bomb. The maximum pressurization rate is a measure of the degree of fracturing. The CIV is that velocity at which the pressurization rate is equal to $2.5 \times 10^6$ psi/sec.

The energetic plasticizer most commonly employed in the crosslinked double base propellants of this invention is nitroglycerin. Other energetic plasticizers which can be employed include liquid nitroesters such as diethyleneglycol dinitrate, triethyleneglycol dinitrate, and butanetriol trinitrate, bis(dinitropropyl)acetal, bis(dinitropropyl)formal, and the like. These energetic plasticizers are employed in an amount of from about 15% to about 25% by weight based on the weight of the propellant. Energetic plasticizers are stabilized primarily with 2-nitrodiphenylamine, N-methyl p-nitroaniline, or mixtures thereof.

The crosslinked propellant composition of this invention contain solid oxidizers. Illustrative oxidizers employed in the crosslinked double base propellants of this invention include by way of illustration, inorganic oxidizers such as ammonium perchlorate and sodium perchlorate, and organic oxidizers such as cyclotetramethylene tetranitramine (HMX), and cyclotrimethylene trinitramine (RDX), and mixtures of organic and inorganic oxidizers.

The crosslinked double base propellants of this invention can contain a variety of fuels, ballistic modifiers, stabilizers and the like which are commonly employed in composite modified double base propellant compositions.

What I claim and desire to protect by Letters Patent is:

1. A crosslinked binder suitable as the binder portion of a crosslinked double base propellant composition in which the crosslinked binder is a urethane rubber comprising the reaction product of:
   (a) nitrocellulose having a nitrogen content of from about 11.0% to 13.4%, an intrinsic viscosity of at least about 0.55 dl./gram to about 2.0 dl./gram.;
   (b) a polymeric diol selected from the group consisting of polyester diols, polyether diols and polyester and polyether diols which have been chain extended by reaction with a diisocyanate, said polymeric diol having a hydroxyl functionality of from about 1.9 to about 2.1 and a molecular weight of from about 1,000 to 10,000; and
   (c) a polyfunctional isocyanate having an NCO functionality of at least three; in which the weight ratio of nitrocellulose to polymeric diol is from about 0.15 to about 0.001 and the ratio of isocyanate functional groups to the combined hydroxyl functionality of the nitrocellulose and polymeric diol is from about 1/1 to about 1.5/1.

2. The crosslinked binder of claim 1 in which the nitrocellulose has a nitrogen content of 12% and an intrinsic viscosity of at least about 0.55 dl./gram.

3. The crosslinked binder of claim 1 in which the polymeric diol is polyethylene glycol having a hydroxyl functionality of 1.9 to 2.1 and a molecular weight of about 2000.

4. The crosslinked binder of claim 1 in which the polymeric diol is a polydiethylene glycol adipate having a hydroxyl functionality of 1.9 to 2.1 and a molecular weight of about 3000.

5. The crosslinked binder of claim 1 in which the polymeric diol is a polydiethylene glycol adipate urethane having a hydroxyl functionality of 1.9 to 2.1 and a molecular weight of 8000 and prepared by reaction of polydiethylene glycol adipate and hexamethylene diisocyanate.

6. The crosslinked binder of claims 3, 4 or 5 in which the polyfunctional isocyanate is the cyclic trimer of hexamethylene diisocyanate having an NCO functionality range of from about 4.0 to about 4.5 and an equivalent weight of about 195.

7. In a crosslinked double base propellant composition comprising an energetic liquid nitrate ester plasticizer, nitrocellulose, organic and inorganic oxidizing agents, fuels, and a crosslinked binder, the improvement comprising as the crosslinked binder a urethane rubber comprising the reaction product of:
   (a) nitrocellulose having a nitrogen content of from about 11.0% to 13.4%, and an intrinsic viscosity of at least about 0.55 dl./gram to about 2.0 dl./gram.;
   (b) a polymeric diol selected from the group consisting of polyester diols, polyether diols and polyester and polyether diols which have been reacted with a diisocyanate, said polymeric diol having a hydroxyl functionality of from about 1.9 to about 2.1 and a molecular weight of from about 1,000 to 10,000; and
   (c) a polyisocyanate having an NCO functionality of at least three;
in which the weight ratio of nitrocellulose to polymeric diol is from about 0.15 to about 0.001 and the ratio of isocyanate functional groups to the combined hydroxyl functionality of the nitrocellulose and polymeric diol is from about 1/1 to about 1.5/1 and in which the weight ratio of said plasticizer to binder is from about 2/1 to less than about 4.5/1.

8. A crosslinked double base propellant composition comprising by weight:
   (a) from about 15% to 25% by weight energetic liquid nitroester plasticizer;
   (b) from about 45% to 55% by weight or organic and inorganic oxidizing agents;
   (c) from about 18% to 22% by weight of particulate solid fuels; and;
   (d) from about 4% to 10% by weight of a urethane rubber binder, said binder comprising the reaction-product of:
      (1) nitrocellulose having a nitrogen content of from about 11.0% to 13.4%, an intrinsic viscosity of at least about 0.55 dl./gram to about 2.0 dl./gram;
      (2) a polymeric diol selected from the group consisting of polyester diols, polyether diols and polyester and polyether diols which have been chain extended by reaction with a diisocyanate, said polymeric diol having a hydroxyl functionality of from about 1.9 to about 2.1 and a molecular weight of from about 1,000 to 10,000; and
      (3) a polyisocyanate having an NCO functionality of at least three;
in which the weight ratio of nitrocellulose to polymeric diol is from about 0.15 to about 0.001 and the ratio of isocyanate functional groups to the combined hydroxyl functionality of the nitrocellulose and polymeric diol is from about 1/1 to about 1.5/1 and in which the weight ratio of said plasticizer to binder is from about 2/1 to less than about 4.5/1.

9. The crosslinked double base propellant of claim 8 in which the energetic liquid nitrate ester plasticizer is nitroglycerin.

* * * * *